United States Patent [19]
Johnson

[11] Patent Number: 5,529,537
[45] Date of Patent: Jun. 25, 1996

[54] GRAIN BIN MONITOR

[76] Inventor: Carl E. Johnson, Rte. 2, Box 3, Wayne, Nebr. 68787

[21] Appl. No.: 430,541

[22] Filed: Apr. 24, 1995

[51] Int. Cl.$^6$ ................................................ A01F 12/60
[52] U.S. Cl. ............................. 460/6; 460/119; 460/150; 56/10.2 R
[58] Field of Search ........................... 460/119, 1, 6, 460/149, 150; 56/10.2 R

[56] References Cited

U.S. PATENT DOCUMENTS

| | | | |
|---|---|---|---|
| 3,593,720 | 7/1971 | Botterill | 130/27 W |
| 3,610,252 | 10/1971 | DeCoene | 130/24 |
| 3,626,402 | 12/1971 | Price | 340/267 R |
| 3,935,866 | 2/1976 | Northup et al. | 130/24 |
| 3,939,846 | 2/1976 | Drozhzhin et al. | 130/27 R |
| 4,259,829 | 4/1981 | Strubbe | 56/10.2 |
| 4,293,854 | 10/1981 | Gookins et al. | 340/615 |
| 4,376,298 | 3/1983 | Sokol et al. | 364/551 |
| 5,318,475 | 6/1994 | Schrock et al. | 460/1 |

FOREIGN PATENT DOCUMENTS

WO92/15192  9/1992  WIPO ........................................ 460/1

*Primary Examiner*—Terry Lee Melius
*Attorney, Agent, or Firm*—Zarley, McKee, Thomte, Voorhees & Sease; Mark D. Frederiksen

[57] ABSTRACT

A combine grain bin monitoring system includes a pair of detectors mounted on the upper edges of opposing side walls of a combine grain bin, for detecting the presence of grain. A visual display module mounted outside of the bin has a visual indicator which is operable in response to a signal received from either of the detectors. A third detector is preferably mounted on the upper end of a support located generally centrally within the bin, and is also electrically connected to the visual indicator such that the visual indicator will operate in response to a signal from either of the side wall detectors or the central detector. Additional detectors may be added to the central support to signal the level of grain within the bin. A visual alert device is electrically connected to the visual display module but spaced remote therefrom. The visual alert device is operable in response to the illumination of a lamp on the visual indicator.

16 Claims, 4 Drawing Sheets

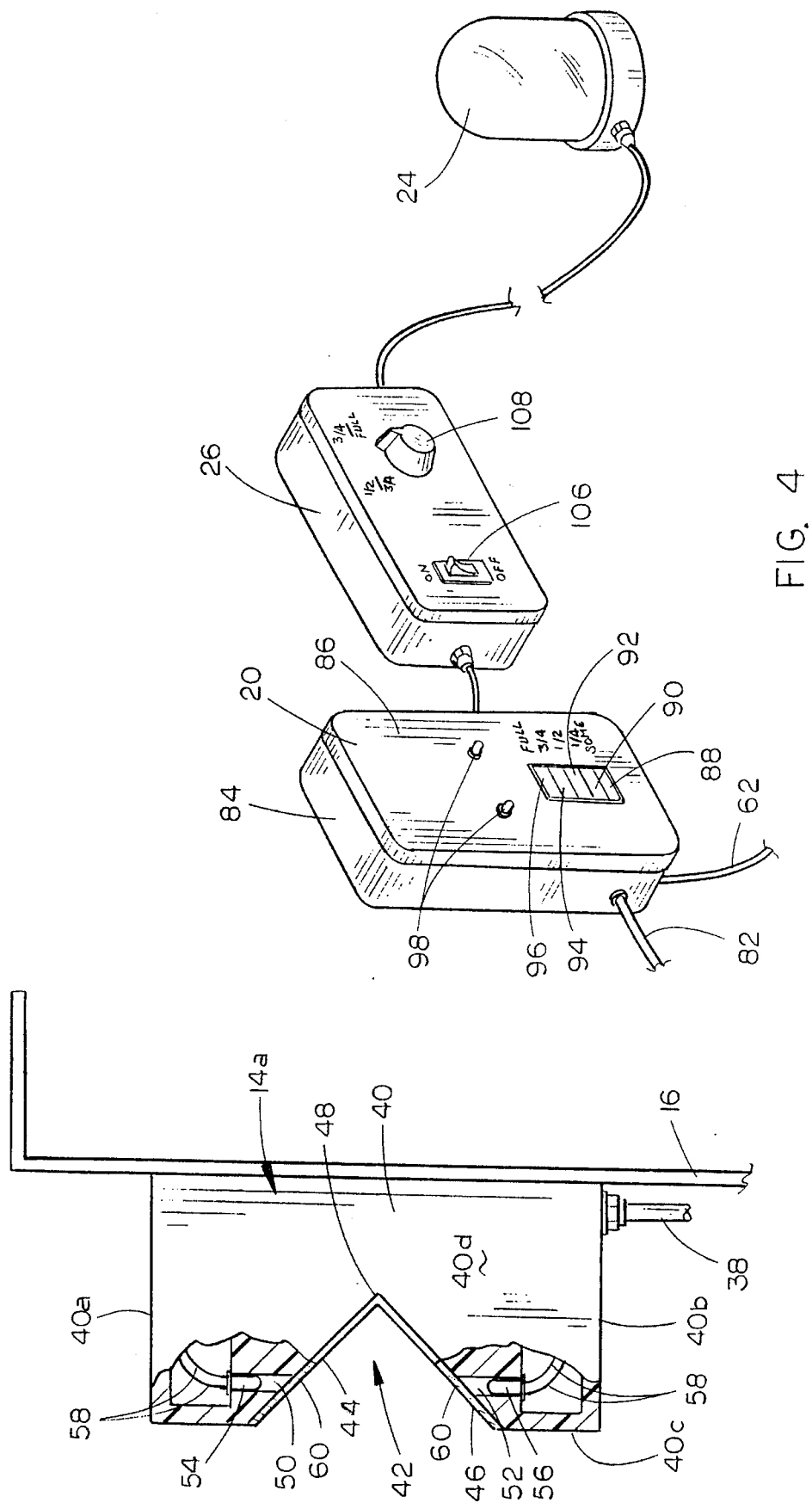

GRAIN BIN MONITOR

TECHNICAL FIELD

The present invention relates generally to combines, and more particularly to an improved monitoring system for a combine grain bin.

BACKGROUND OF THE INVENTION

It has long been a problem of harvesting equipment to determine the amount of grain which has been stored within the bin of the combine. Initially, it was necessary for the operator to turn around and physically look into the grain bin to see the level of grain. As the cost of crop production rises, any spillage of grain becomes more and more expensive for the farmer, and it therefore becomes critical to ensure that the grain bin does not overflow onto the ground. Many combines now utilize grain bin extensions, making the bin taller than the top of the cab, and thereby preventing viewing from within the cab.

Various monitoring systems are now available for harvesters which are much more effective than requiring the operator to physically view the contents of the combine grain bin. A majority of the most common monitoring systems utilize a mechanical switch or float within the grain bin which will trigger a light in the cab when the grain has reached the "full" line. While conventional monitors were a great advance over physical viewing of the bin contents, they still suffer several drawbacks.

First, many farms today utilize sloped or hilly grounds for crop production. Because conventional grain monitor switches are located centrally within the bin, it is possible for grain to overflow over the side edge of the grain bin on a side hill before the level of grain within the center of the bin activates the mechanical switch to indicate "full".

Another problem with current bin monitoring systems is in the fact that a signal lamp is only activated once the grain has completely filled the bin. If the operator desires to continue harvesting while the grain bin is unloaded into a wagon traveling beside the harvester, it typically causes a delay for the combine operator to report the "full" condition to the grain hauler located at the side of the field. Thus, much of the time saved in continued harvesting is lost during the wait for the grain hauler to bring the empty wagon alongside the combine.

Finally, most current grain monitoring systems utilize mechanical devices having moving parts. The more moving parts present within the grain bin, the greater the likelihood of repair or replacement of the monitoring system.

SUMMARY OF THE INVENTION

It is therefore a general object of the present invention to provide an improved grain monitoring system for combines.

Another object is to provide a combine bin monitor which will reduce the likelihood of grain spillage over the sides of the grain bin.

A further object of the present invention is to provide a combine bin monitor with no moving parts within the grain bin.

Still another object is to provide a monitoring system which is impervious to fluctuations in the electrical system voltage of the combine.

Yet another object of the present invention is to provide a combine bin monitor which alerts the combine operator to the amount of grain in the bin.

Still another object of the present invention is to provide a grain bin monitoring system which detects the level of grain on the side walls of a combine grain bin to alert the driver of a "full" condition during side hill operation.

Yet a further object is to provide a combine bin monitoring system which is simple to install, economical to manufacture, and easy to use.

These and other objects will be apparent to those skilled in the art.

The combine grain bin monitoring system of the present invention includes a pair of detectors mounted on the upper edges of opposing side walls of a combine grain bin, for detecting the presence of grain. A visual display module mounted outside of the bin has a visual indicator which is operable in response to a signal received from either of the detectors. A third detector is preferably mounted on the upper end of a support located generally centrally within the bin, and is also electrically connected to the visual indicator such that the visual indicator will operate in response to a signal from either of the side wall detectors or the central detector. Additional detectors may be added to the central support to signal the level of grain within the bin. A visual alert device, is electrically connected to the visual display module but spaced remote therefrom. The visual alert device is operable in response to the illumination of a lamp on the visual indicator.

BRIEF DESCRIPTION OF THE DRAWINGS

FIG. 3 is an enlarged side elevational view of one of the plurality of detectors utilized in the system;

FIG. 4 is a perspective view of a display module, strobe light and alert indicator adjustment module of the monitoring system;

DESCRIPTION OF THE PREFERRED EMBODIMENT

Figure 1:
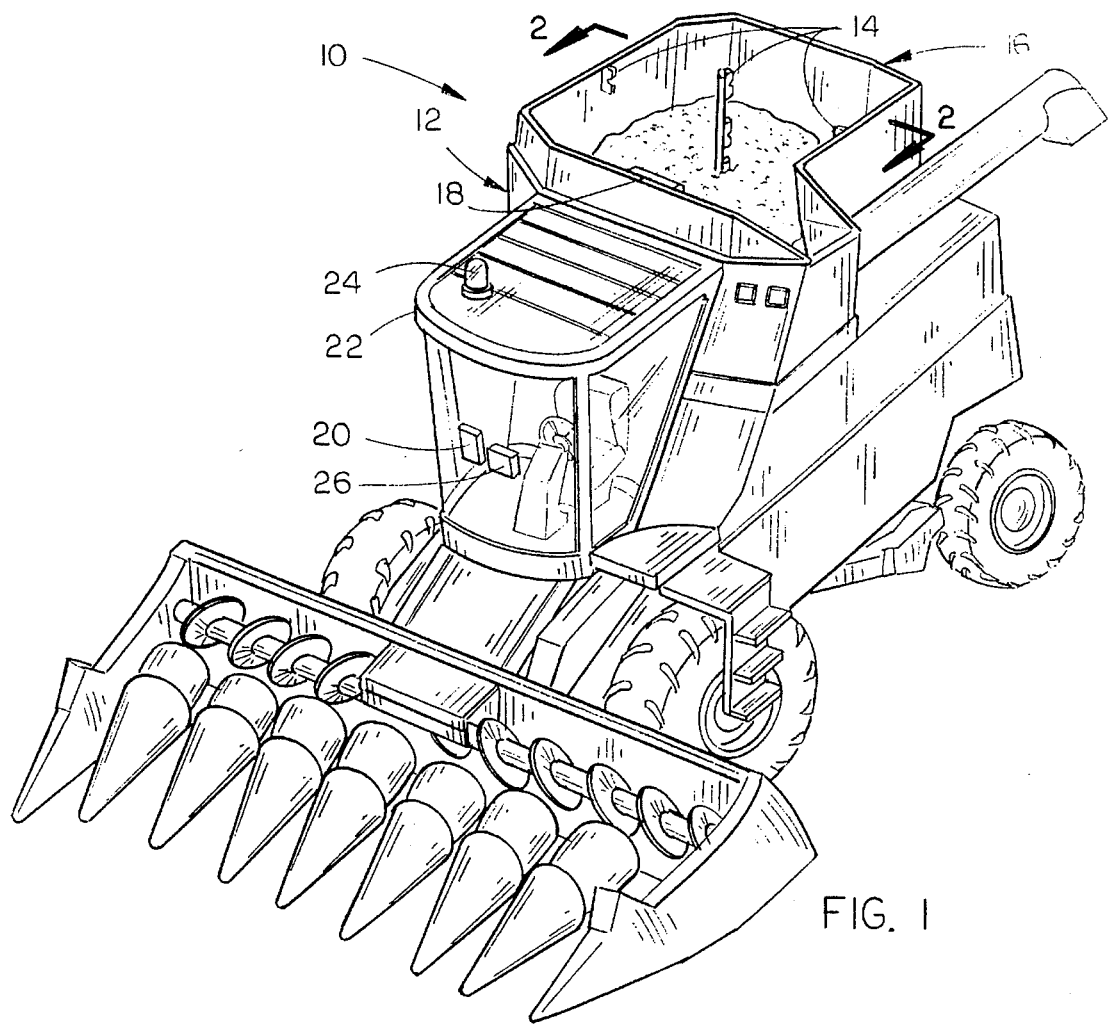
FIG. 1 is a perspective view of a combine with the monitoring system of the present invention.

Referring now to the drawings, in which similar or corresponding pads are identified with the same reference numeral and more particularly to FIG. 1, the grain bin monitoring system of the present invention is designated generally at 10 and is shown mounted on a combine 12. Monitoring system 10 includes a plurality of detectors 14 mounted within the grain storage bin 16 of combine 12, and electrically connected to a central electronic module 18, also mounted within bin 16. Central electronic module 18 is electrically connected to a display module 20 mounted within a cab 22 of combine 12. A strobe light 24 and alert indicator adjustment module 26 are electrically connected to display module 20, as described in more detail hereinbelow.

Figure 2:
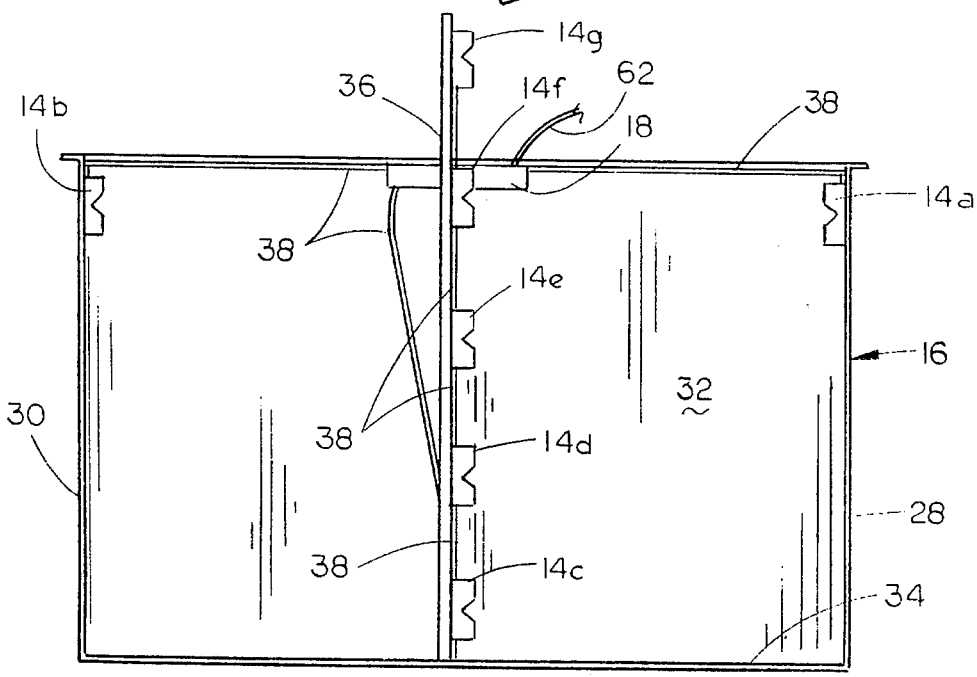
FIG. 2 is a sectional view through the grain bin of the combine, taken at lines 2—2 in FIG. 1.

Referring now to FIG. 2, grain bin 16 includes a pair of vertically disposed and opposing side walls 28 and 30, a forward wall 32 and a bottom 34. A first detector 14a is mounted on side wall 28 adjacent the upper edge thereof, and serves to detect the accumulation of grain at that location. A second detector 14b is attached to the opposing side wall 30 adjacent the upper edge, to detect the accumulation of grain against side wall. A series of five detectors 14c, 14d, 14e, 14f and 14g are mounted on a vertical post 36 which is mounted generally centrally within grain bin 16. Detectors 14c-14g are vertically spaced apart along post 36 with detector 14c immediately adjacent bin bottom 34, and detector 14g located spaced vertically above a horizontal plane passing through side wall detectors 14a and 14b. Detectors 14d, 14e and 14f are preferably spaced uniformly between lower and upper detectors 14c and 14g. Each detector 14a-14g is electrically connected to central electronic module 18 by an electrical conductor 38.

Referring now to FIG. 3, one detector 14a, is shown in more detail. Because detectors 14 are all identical in construction, only one will be shown and described in detail. Detector 14 includes an opaque rigid plastic main body 40 having upper and lower surfaces 40a and 40b, a front surface 40c and opposing side surfaces 40d and 40e (not shown). A horizontally disposed notch 42 is formed in body front surface 40c and forming a downwardly sloped upper wall 44 and an upwardly sloped lower wall 46. Preferably, upper and lower walls are sloped at approximately 45° relative to front surface 40c, so as to meet at a right angle at juncture 48.

A vertically oriented upper passage 50 is formed in upper wall 44, and a lower passage 52 is formed in lower wall 46, and vertically aligned and coaxial with upper passage 50. An infrared photo transistor 54 is mounted within upper passage 50, and an infrared emitter 56 is mounted in lower passage 52. Electrical wires 58 extend from terminals on emitter 56 and photo transistor 54 through cavities formed in body 40, and thence to conductor cable 38.

A clear plastic window 60 is mounted on both upper and lower walls 44 and 46 of notch 42 so as to permit infrared light to pass therethrough but prevent infiltration of dirt and moisture into passages 50 and 52. Because upper and lower notch walls 44 and 46 are sloped, any grain or other material will slide out from between emitter 56 and receiver 54 upon lowering of the level of grain within bin 16. In addition, any reflective interference which may occur with parallel windows is eliminated by orienting windows 60 at an angle. Thus, incidental ambient light will not interfere with the correct operation of the emitter 56 and receiver 54.

Referring once again to FIG. 2, each detector 14 is electrically connected to central electronics module 18 with three-wire conductor 38. Electronic module 18 includes an electrical circuit therein which amplifies the signal received from detectors 14, processes the amplified signal from each of the individual detectors 14, and combines the received signals into a single signal wire 62, which extends to the cab mounted visual display module 20 (shown in FIGS. 1 and 4). Electronics module 18 includes a voltage control circuit, so that any changes in the electrical system of the combine (from a non-running condition to an operating condition) will not effect operation of the monitor 10. Electronics module 18 supplies "conditioned" electricity which is passed through the voltage control circuit, to each of the seven detectors on conductor 38.

Figure 5:
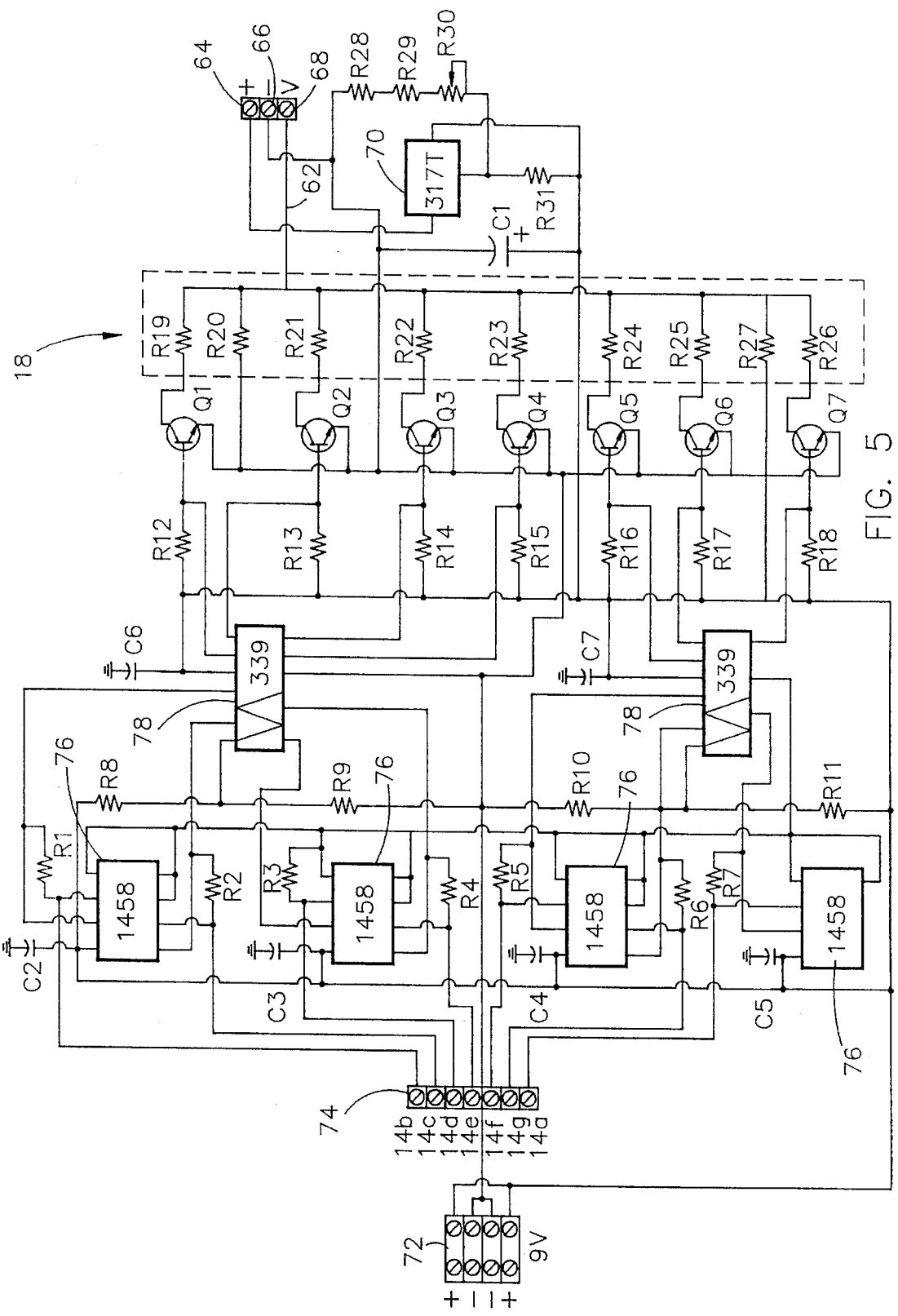
FIG. 5 is an electrical schematic of the central electronics module.

Referring now to FIG. 5 a schematic diagram of the central electronics module 18 is shown. On the right hand side of the circuit, terminals 64 and 66 are electrically connected to the positive and negative terminals of the electrical system of the combine, which supplies 12–14 volts to module 18. Signal wire 62 is connected to terminal 68, and continues to the cab display unit 20, as described in more detail below.

Power from positive terminal 64 is passed through adjustable voltage regulator 70, which is preferably set to a 9 volt output. Power from regulator 70 is provided both to electronics module 18, as well as each of the seven detectors 14. A terminal strip 72 provides positive and negative terminal connections for detectors 14. Similarly, a terminal strip 74 provides individual terminals for each of the variable voltage wires coming from detectors 14.

The signal from each detector 14, transmitted through terminal strip 74, is first passed through a dual operational amplifier 76, which amplifies the signal from the photo transistor and sends an appropriate signal to a quad comparator 78. Comparators 78 compare the amplified signals from detectors 14 to the reference voltage 4.5 volts, which is set up by resistors R8–R11. Signals from comparators 78 are fed through transistors Q1–Q7 and thence through a voltage divider circuit 80 before being passed to wire 62. Thus, when no grain is within bin 16 (see FIG. 1) the voltage on variable wire 62 is 7.4 volts. When one detector 14 detects the presence of grain, the voltage on wire 62 changes to 6.3 volts. When two detectors detect the presence of grain, the voltage changes to 5.4 volts on wire 62. When three modules detect grain, the voltage on wire 62 changes to 4.8 volts, while four modules change the voltage to 4.3 volts. Finally, the detection of grain by five modules represents a "full" condition of the bin, and changes the voltage on wire 62 to 3.9 volts. It can be seen that the use of voltage divider circuit will transmit a given voltage regardless of the specific detectors which are detecting the presence of grain.

Referring now to FIG. 4, visual display module 20 is mounted in the cab of the combine, and is electrically connected to central electronics module 18 via variable wire 62. Electrical power from the combine is supplied through conductor 82. Display module 20 preferably includes a housing 84 having a front panel 86 and a vertically aligned series of light emitting diodes (LED) 88, 90, 92, 94, and 96. When one detector 14 (see FIG. 2) detects the presence of grain within bin 16, LED 88 will be illuminated. When a second detector detects grain, LED 90 will be illuminated. A third detector will illuminate LED 92 and a fourth detector will illuminate LED 94. As shown in FIG. 2, the first four detectors to be actuated would be detectors 14c, 14d, 14e and 14f. Depending upon whether the combine is on a side hill or on level ground will determine whether the fifth detector activated will be detector 14g, detector 14a or detector 14b. However, the activation of any one of detectors 14a, 14b or 14g will cause a "full" indication and the illumination of LED 96 in FIG. 4. The activation of a fifth detector will also activate a pair of alternately flashing LED lamps 98, to further alert the combine operator of the "full" condition of the grain bin.

Figure 6:
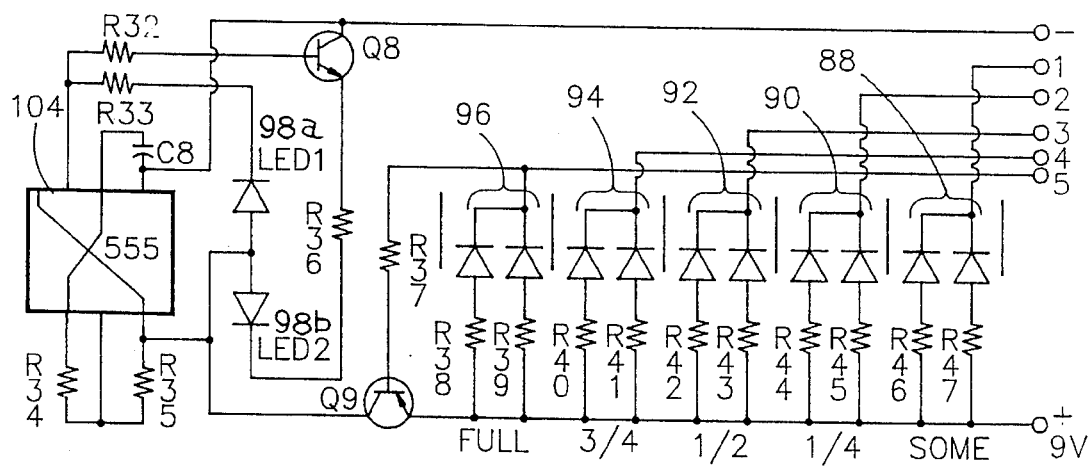
FIG. 6 is an electrical schematic of one-half of the circuitry of the cab unit.
Figure 7:
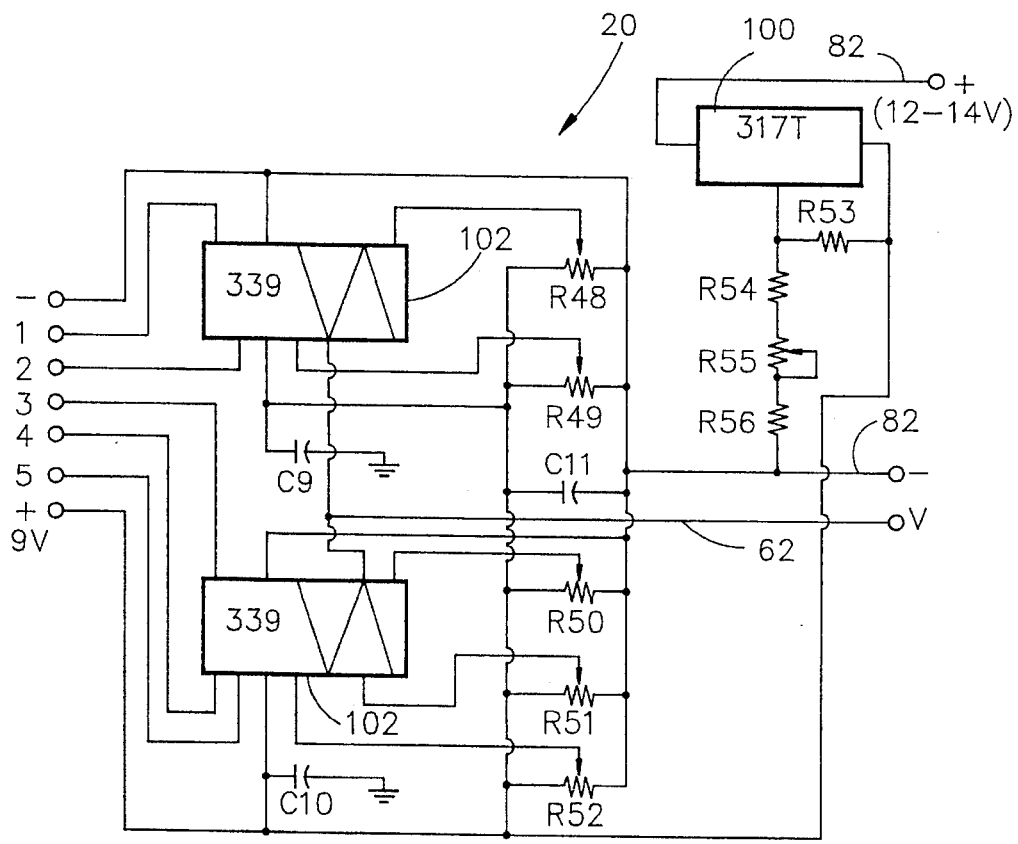
FIG. 7 is an electrical schematic of the second half of the cab unit circuitry.

Referring now to FIG. 6, it can be seen that electrical power from the positive terminal of the combine (via conductor 82) is also passed through an adjustable voltage regulator 100. The incoming variable voltage signal wire 62 is connected to the non-inverting inputs (plus) of a pair of comparators 102. The inverting inputs (minus) of comparators 102 are provided with a reference voltage supplied by trimmer resistors $R_{48}$–$R_{52}$, which act as voltage dividers. Referring now to FIGS. 6 and 7, outputs from comparators 102 will cause illumination of one or more LEDs 88–96. Upon activation of all five LEDs, a ground condition is caused at the base of transistor $Q_9$, through bias resistor $R_{37}$. Transistor $Q_9$ sends positive current to LED 98, and also turns on timer 104. Timer 104 directly sends approximately one hertz grounded pulses to LED 98a. On alternate cycles, the positive cycle biases transistor $Q_8$ through resistor $R_{32}$. Thus, timer 104 makes LEDs 98b and 98a alternately flash on and off.

In the preferred embodiment, the resistors, capacitors and transistors of the schematic diagrams of FIGS. 5–7 have the following values:

$R_1$–$R_7$=1M ohms
$R_8$–$R_{11}$=4.7K ohms
$R_{12}$–$R_{18}$=1K ohms
$R_{19}$–$R_{26}$=4.7K ohms
$R_{27}$–$R_{28}$=1K ohms
$R_{29}$=680 ohms
$R_{30}$=1K ohms, adjustable
$R_{31}$=270 ohms
$R_{48}$–$R_{52}$=10K ohms, adjustable
$R_{53}$=270 ohms
$R_{54}$=1K ohms
$R_{55}$=1K ohms, adjustable
$R_{56}$=680 ohms
$R_{32}$=1K ohms
$R_{33}$=470 ohms
$R_{34}$=470K ohms
$R_{35}$=220K ohms
$R_{36}$=470 ohms
$R_{37}$=1K ohms
$R_{38}$–$R_{47}$=470 ohms
$C_1$=10 µF
$C_2$–$C_7$=0.1 µF
$C_{11}$=10 µF
$C_8$=1 µF
$C_9$–$C_{10}$=0.1 µF
$Q_1$–$Q_8$=NPN MPS 3904
$Q_9$=PNP MPS 2907

Referring once again to FIG. 4, a strobe light 24 is connected via an adjustment module 26 to display module 20. Adjustment module 26 includes an on/off switch 106 and a selector switch 108 electrically connected between display unit 20 and strobe light 24. On/off switch 106 electrically connects strobe light 24 and adjustment module 26 to the electrical circuit of display module 20 to enable activation of strobe light 24. Preferably, selector switch 108 permits selection of the timing of the flashes of strobe light 24 relative to the activation of an LED 92–96 of display module 20. When set in the one-half/three-quarter position, a single strobe flash would occur when LED 92 is first activated, thereby indicating to the driver of a grain transport wagon that the combine grain bin is one-half full. When each of LEDs 94 and 96 are activated, a pair of flashes of strobe 24 would occur.

Repositioning selector switch 108 to the three-quarters/full position would cause a single flash to occur with the activation of LED 94, and two flashes to occur with the activation of LED 96. It can be seen that strobe light 24 permits a grain hauler at the edge of a field to know how soon he must begin driving through the field to remove the load of grain from the combine.

Whereas the invention has been shown and described in connection with the preferred embodiment thereof, many modifications, substitutions and additions may be made which are within the intended broad scope of the appended claims.

I claim:

1. A combine grain bin monitoring system comprising the combination of:

a grain bin having a first vertical side wall with an upper edge and a bottom;

a first detector mounted on said side wall adjacent the upper edge, for detecting the presence of grain at the side wall upper edge;

said grain bin having a second vertical side wall opposite the first side wall, and having an upper edge;

a second detector mounted on a support located generally centrally within the bin, said second detector located vertically above a plane extending between the upper edges of the first and second side walls, for detecting the presence of grain piled generally centrally with the bin;

a third detector mounted on said second side wall adjacent the upper edge, for detecting the presence of grain at the second side wall upper edge;

a visual display module mounted outside the bin, with a visual indicator operable in response to a signal from any of the first, second or third detectors;

means electrically connecting said first, second and third detectors to said visual display module, for transmitting a signal emitted by said detectors upon detection of the presence of grain;

a fourth detector mounted on a support and located vertically below the second detector, generally centrally within the bin;

said electrical connection means including a control module with a processor for processing signals from detectors;

said first, second, third and fourth detectors electrically connected to said control module, for transmitting a signal thereto upon detection of the presence of grain;

said processor adapted to receive and process signals from said detectors, and to transmit a first signal to the visual display module in response to receipt of a signal from the fourth detector, and to transmit a second signal to the visual display module in response to receipt of a signal from the fourth detector in combination with a signal from any one of the first, second or third detectors;

said visual display module electrically connected to the control module to receive signals therefrom;

said visual indicator including a first lamp operable to illuminate in response to receipt of the first signal from the control module, and a second lamp operable to illuminate in response to receipt of the second signal from the control module.

2. The monitoring system of claim 1, wherein said first lamp is operable to illuminate in response to receipt of either the first or second signal from the control module.

3. The monitoring system of claim 1, further comprising:

a visual alert device electrically connected to, but spaced remote from, the visual display module;

said visual alert device operable in response to operation of the visual indicator on the visual display module.

4. The monitoring system of claim 3, wherein said visual alert device is a strobe light, and wherein the strobe light is operable to emit a flash of light in response to operation of the visual indicator.

5. The monitoring system of claim 1, further comprising:
a visual alert device electrically connected to, but spaced remote from, the visual display module;
a selector switch electrically connected between the visual alert device and the display module, operable between first and second positions;
said selector switch first position closing a circuit to transmit a signal from the display module upon receipt by the display module of the first signal from the control module; and
said selector switch second position closing a circuit to transmit a signal from the display module upon receipt by the display module of the second signal from the control module;
said visual alert device operable in response to receipt of a signal form the display module.

6. The monitoring system of claim 5, wherein said visual alert device is a strobe light, and wherein the strobe light is operable to emit a flash of light in response to receipt of a signal from the display module.

7. The monitoring system of claim 1, wherein said means electrically connecting the first, second, and third detectors to the display module includes a control module with a processor for processing signals from the detectors and transmitting a signal to the display module in response to signals from the detectors.

8. The monitoring system of claim 7, wherein said control module is connected to a source of electricity, and further comprising a voltage control circuit in said control module for regulating output voltage from the control module, said control module connected to the detectors to supply regulated electricity thereto.

9. The monitoring system of claim 7, wherein each detector includes:
an opaque body having forward and rearward vertical faces, opposing vertical side faces, and opposing top and bottom surfaces;
a generally horizontal notch formed in the forward face, having an upper wall extending rearwardly and a lower wall sloping upwardly and rearwardly to join the upper wall at a juncture line;
an upper passage extending vertically upwardly into the notch upper wall;
a lower passage extending vertically downwardly into the notch lower wall and aligned with the upper passage;
a light emitter mounted in the lower passage, operable to emit light upwardly;
a receiver for detecting light from the emitter, mounted in the upper passage; and
said emitter and receiver connected to the control module to receive electrical power therefrom and to transmit a signal thereto in response to the blockage of light from the emitter to the receiver.

10. The monitoring system of claim 9, each detector further including:
a clear plate window mounted on the notch upper wall to cover the upper passage and seal the passage from dirt and moisture;
a clear plate window mounted on the notch lower wall to cover and seal the lower passage.

11. The monitoring system of claim 9, wherein each detector notch upper wall slopes downwardly and rearwardly to the juncture line.

12. The monitoring system of claim 7, wherein said control module includes an amplifier circuit for amplifying signals received from the detectors and transmitting the amplified signals to the processor.

13. The monitoring system of claim 8, wherein said control module includes an amplifier circuit for amplifying signals received from the detectors and transmitting the amplified signals to the processor.

14. In combination:
a crop harvester of the type having a grain bin for storage of harvested grain and a cab with an interior and a roof; and
monitoring system for monitoring the level of grain within the bin and displaying the detected level to an operator within the cab, comprising:
a vertical support post located generally centrally within the grain bin and extending from a bin floor to a point above a horizontal "top" plane passing through upper edges of vertical side walls of the bin;
a first plurality of detectors mounted on the support post and vertically spaced apart thereon, said first plurality including a lower detector located adjacent the bin bottom, an upper detector located adjacent and below the "top" plane, and at least one intermediate detector located between the lower and upper detectors;
a second plurality of detectors, including a first side detector located adjacent the upper edge of a first bin side wall, a second side detector located adjacent the upper edge of a second bin side wall opposite the first side wall, and a central detector located on the support post above the "top" plane;
each of said detectors operable to transmit a signal upon detection of the presence of grain;
an electronic control module mounted on said bin and electrically connected to all of said detectors to receive signals therefrom;
said control module including a processor for receiving and processing signals from said detectors, and for transmitting processed signals to a visual display module in the cab;
said processor including a first electrical circuit for:
transmitting a first signal in response to receipt of a signal from the lower detector;
transmitting a second signal in response to receipt of a signal from both the lower and intermediate detectors;
transmitting a third signal in response to receipt of a signal from all of said first plurality of detectors; and
transmitting a fourth signal in response to receipt of a signal from all of the first plurality of detectors in addition to a signal from one of said second plurality of detectors; and
a visual display module mounted in said cab and electrically connected to said control module to receive signals therefrom;
said visual display module including a plurality of lamps operable in response to signals received from said control module.

15. The monitoring system of claim 14, wherein said plurality of lamps includes one lamp corresponding with each of said first plurality of detectors and one lamp corresponding with the second plurality of detectors.

16. The monitoring system of claim 15, wherein said plurality of lamps includes:

a first lamp operable in response to receipt of said first signal from the control module;

a second lamp operable in response to receipt of said second signal from the control module;

a third lamp operable in response to receipt of the third signal from the control module; and a fourth lamp operable in response to receipt of the fourth signal from the control module.

* * * * *